United States Patent
Czaplewski et al.

(10) Patent No.: US 9,725,577 B1
(45) Date of Patent: Aug. 8, 2017

(54) SELF-HEALING THERMAL INTERFACE MATERIALS

(71) Applicant: International Business Machines Corporation, Armonk, NY (US)

(72) Inventors: Sarah K. Czaplewski, Rochester, MN (US); Joseph Kuczynski, North Port, FL (US); Jason T. Wertz, Pleasant Valley, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/251,270

(22) Filed: Aug. 30, 2016

(51) Int. Cl.
| | | |
|---|---|---|
| C08K 3/14 | (2006.01) | |
| C08K 5/3477 | (2006.01) | |
| C08K 3/22 | (2006.01) | |
| C08L 83/08 | (2006.01) | |
| C09K 5/14 | (2006.01) | |

(52) U.S. Cl.
CPC .............. C08K 5/3477 (2013.01); C08K 3/22 (2013.01); C08L 83/08 (2013.01); C09K 5/14 (2013.01); C08K 2003/2227 (2013.01); C08L 2205/025 (2013.01)

(58) Field of Classification Search
CPC . C08K 2003/2227; C08K 3/22; C08K 3/3477
See application file for complete search history.

(56) References Cited

U.S. PATENT DOCUMENTS

| | | | |
|---|---|---|---|
| 6,433,055 B1 | 8/2002 | Kleyer et al. | |
| 6,639,008 B2 | 10/2003 | Lewis et al. | |
| 7,060,747 B2 | 6/2006 | Matayabas, Jr. | |
| 7,329,706 B2 * | 2/2008 | Fukui | C08L 83/04 |
| | | | 524/588 |
| 7,651,938 B2 | 1/2010 | Too et al. | |
| 7,999,394 B2 | 8/2011 | Too et al. | |
| 8,575,291 B2 * | 11/2013 | Katayama | C08K 5/3445 |
| | | | 525/474 |
| 8,917,510 B2 | 12/2014 | Boday et al. | |
| 9,070,660 B2 | 6/2015 | Lowe, Jr. et al. | |
| 9,085,719 B2 | 7/2015 | Boday et al. | |
| 2010/0264536 A1 | 10/2010 | Shankar et al. | |
| 2011/0141698 A1 | 6/2011 | Chiou et al. | |
| 2014/0368992 A1 | 12/2014 | Strader et al. | |

OTHER PUBLICATIONS

Christian Moreno Belle, *Self-Healing in Thermal Interface Materials*, Delft University of Technology, Master of Science Thesis, http://www.experta-benelux.com/Application%20Notes/Self%E2%80%90Healing%20in%20Thermal%20Interface%20Materials.pdf (online), Aug. 13, 2012, 87 pages.

Mather et al., *Supramolecular Triblock Copolymers Containing Complementary Nucleobase Molecular Recognition*, Macromolecules, vol. 40, No. 19, American Chemical Society, DOI: 10.1021/ma070865y, published Aug. 28, 2007, 12 pages.

* cited by examiner

*Primary Examiner* — Margaret Moore
(74) *Attorney, Agent, or Firm* — Brandon C Kennedy; Steven L. Bennett; Kennedy Lenart Spraggins LLP

(57) ABSTRACT

A self-healing thermal interface material includes a reactive silicone-based material and a thermally conductive filler material. The reactive silicone-based material is modified to include one or more hydrogen bonding functional groups. The thermally conductive filler material is modified to include a thymine functional group or an adenine functional group.

20 Claims, 11 Drawing Sheets

SELF-HEALING THERMAL INTERFACE MATERIALS

BACKGROUND

Thermal interface materials are used to couple a heat generating device (e.g., a die or a lidded die) to a heat sink or a cold plate. Thermal interface materials are available in several forms, including a gel, a paste, a pad, or a grease. Very thin bond lines can be achieved with pastes and/or gels and are, therefore, favored for those applications where high heat loads need to be dissipated from the chip or die. One problem associated with the paste or gel, however, is thermal "pumping" that occurs during power cycling. That is, system power results in the components heating up and subsequently expanding and reducing the bond line. With system power off, components cool and contract, and the bond line increases. The net result of this cyclic expansion/contraction is that the thermal interface material is pumped out of the bond line, resulting in air gaps or voids, which are detrimental to system performance. Consequently, the advantages of using a gel or grease thermal interface material are offset by this degradation in performance.

SUMMARY

According to an embodiment, a self-healing thermal interface material is disclosed. The self-healing thermal interface material includes a reactive silicone-based material and a thermally conductive filler material. The reactive silicone-based material is modified to include one or more hydrogen bonding functional groups.

According to another embodiment, a self-healing thermal interface material is disclosed that includes a silicone-based material, a first thermally conductive filler material and a second thermally conductive filler material. The first thermally conductive filler material is modified to include a thymine functional group, and the second thermally conductive filler material is modified to include an adenine functional group.

According to another embodiment, a process of forming a self-healing thermal interface material is disclosed. The process includes modifying a reactive silicone-based material to include one or more hydrogen bonding functional groups. The process also includes forming a blend that includes the modified reactive silicone-based material and a thermally conductive filler material. The process further includes forming a self-healing thermal interface material that includes the blend.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present disclosure describes self-healing thermal interface materials and methods of forming self-healing thermal interface materials. The self-healing thermal interface materials of the present disclosure may be generated using thermally conductive filler materials which are blended into a silicone-based material that affords the ability to self-heal when cracking or voiding occurs via functional groups that have been attached to the silicone. The silicone-based materials of the present disclosure include reactive silicones that are modified to incorporate functional groups that, when in contact with each other, allow for hydrogen bonding. Hydrogen bonding between the functional groups enables the thermal interface material to "self-heal" itself as it undergoes thermal pumping.

As described further herein, examples of hydrogen bonding functional groups include adenine functional groups and thymine functional groups. In some cases, the hydrogen bonding functional groups may be incorporated into a single modified reactive silicone material that may be blended with conductive fillers to generate the self-healing thermal interface materials of the present disclosure. In other cases, one functional group (e.g., an adenine functional group) may be incorporated into a first modified reactive silicone-based material, and a corresponding functional group (e.g., a thymine functional group) may be incorporated into a second modified reactive silicone-based material. Alternatively, a modified reactive silicone material may be blended with a thermally conductive filler material that has been modified with a functional group that allows for additional hydrogen bonding. While the present disclosure describes adenine and thymine as examples of functional groups that allow for hydrogen bonding, it will be appreciated that alternative hydrogen bonding moieties may be utilized.

Figure 1:
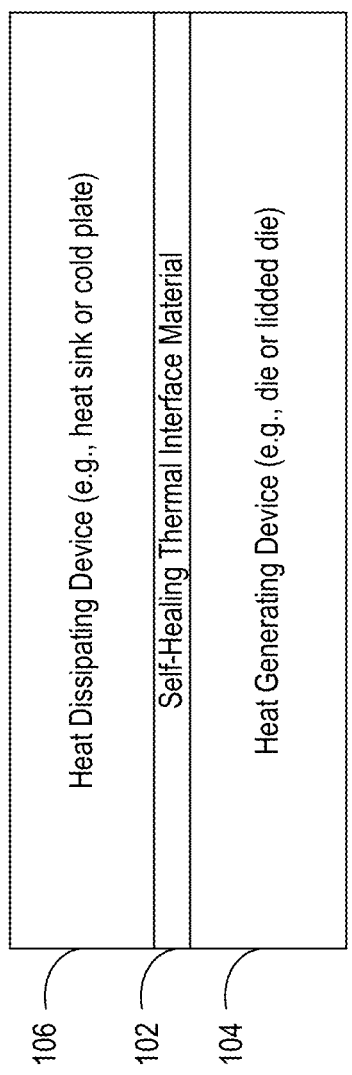
FIG. 1 is a block diagram of an apparatus that includes a self-healing thermal interface material of the present disclosure disposed between a heat generating device and a heat dissipating device, according to one embodiment.

Referring to FIG. 1, a diagram 100 illustrates an example of an apparatus that includes a self-healing thermal interface material 102 disposed between a heat generating device 104 (e.g., a die or a lidded die) and a heat dissipating device 106 (e.g., a heat sink or a cold plate). As described further herein, the self-healing thermal interface material 102 depicted in FIG. 1 may include thermally conductive fillers which are blended into a silicone-based material that affords the ability to self-heal when cracking or voiding occurs via functional groups that have been attached to the silicone material. For example, the silicone-based materials of the present disclosure include reactive silicones that are modified to incorporate functional groups that, when in contact with each other, allow for hydrogen bonding. Hydrogen bonding between the functional groups enables the thermal interface material to "self-heal" itself as it undergoes thermal pumping.

Figure 2:
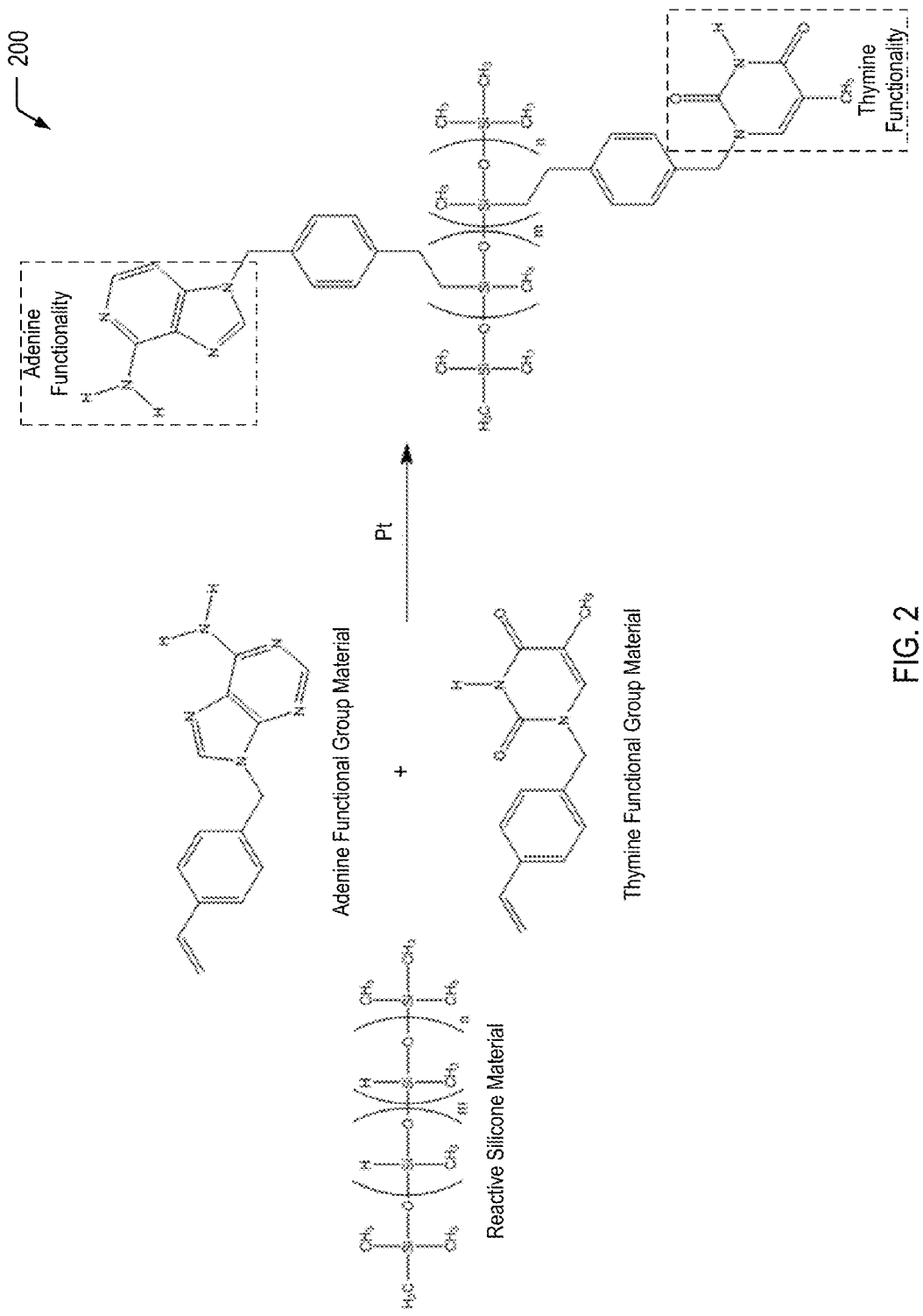
FIG. 2 is a chemical reaction diagram illustrating a process of modifying a reactive silicone material to incorporate functional groups that allow for hydrogen bonding, according to one embodiment.

In one embodiment, the self-healing thermal interface material 102 of FIG. 1 may include a thermally conductive filler material (e.g., alumina) that includes the silicone-based material that includes two functional groups as depicted in FIG. 2. In another embodiment, the self-healing thermal interface material 102 of FIG. 1 may include a thermally conductive filler material (e.g., alumina) that includes the blend of the modified silicone-based materials depicted in FIG. 3. In another embodiment, the self-healing thermal interface material 102 of FIG. 1 may include the blend of modified thermally conductive filler materials depicted in FIG. 7 (along with a modified or non-modified silicone-based material). In a further embodiment, the self-healing thermal interface material 102 of FIG. 1 may include the blend of materials depicted in FIG. 8. In yet another embodiment, the self-healing thermal interface material 102 of FIG. 1 may include the blend of materials depicted in FIG. 9.

Referring to FIG. 2, a chemical reaction diagram 200 illustrates a particular embodiment of a process of modifying a reactive silicone material to incorporate functional groups that allow for hydrogen bonding. As described further herein, the resultant material depicted in FIG. 2 may be blended with thermally conductive filler material(s) such as alumina to generate a self-healing thermal interface material.

In the reactive silicone material of FIG. 2, the integer m is used to designate portions of the silicone polymer backbone where hydrogens chemically react with the adenine functional group material to incorporate the adenine functionality into the polymer backbone, and the integer n is used to designate portions of the silicone polymer backbone where hydrogens chemically react with the thymine functional group material to incorporate the thymine functionality into the polymer backbone.

In the particular embodiment illustrated in FIG. 2, the adenine functional group material (depicted at the top of FIG. 2) is 9-(4-vinylbenzyl)-9H-purin-6-amine. In other embodiments, alternative and/or additional materials that include adenine functional groups may be utilized. In the particular embodiment illustrated in FIG. 2, the thymine functional group material (depicted at the bottom of FIG. 2) is 5-methyl-1-(4-vinylbenzyl)pyrimidine-2,4(1H,3H)-dione.

In other embodiments, alternative and/or additional materials that include thymine functional groups may be utilized. FIG. 2 further illustrates that a catalyst such as platinum (Pt) may be utilized to bond the functional group materials to the silicone polymer backbone. The right side of the chemical reaction diagram of FIG. 2 illustrates that the resultant product includes both adenine functional groups and thymine functional groups bound to the silicone polymer backbone.

FIG. 2 depicts an example in which the reactive silicone material is chemically reacted with a blend of the adenine functional group material and the thymine functional group material. In other cases, the individual chemical reactions may be performed separately, with low concentration to ensure selective reaction with available hydrogens. As an example, the reactive silicone material may be reacted with a low concentration of the adenine functional group material, followed by chemical reaction of the resultant product with the thymine functional group material. As another example, the reactive silicone material may be reacted with a low concentration of the thymine functional group material, followed by chemical reaction of the resultant product with the adenine functional group material.

Thus, FIG. 2 illustrates an example of a process of forming a functionalized silicone-based material that includes two functional groups bonded to a polymer chain of a reactive silicone material. When in contact, the two functional groups (e.g., adenine and thymine functional groups) allow for hydrogen bonding. As described further herein, the ability of the functional groups to form hydrogen bonds allows the resultant product depicted in FIG. 2 to be utilized as a component of a self-healing thermal interface material.

Figure 3:
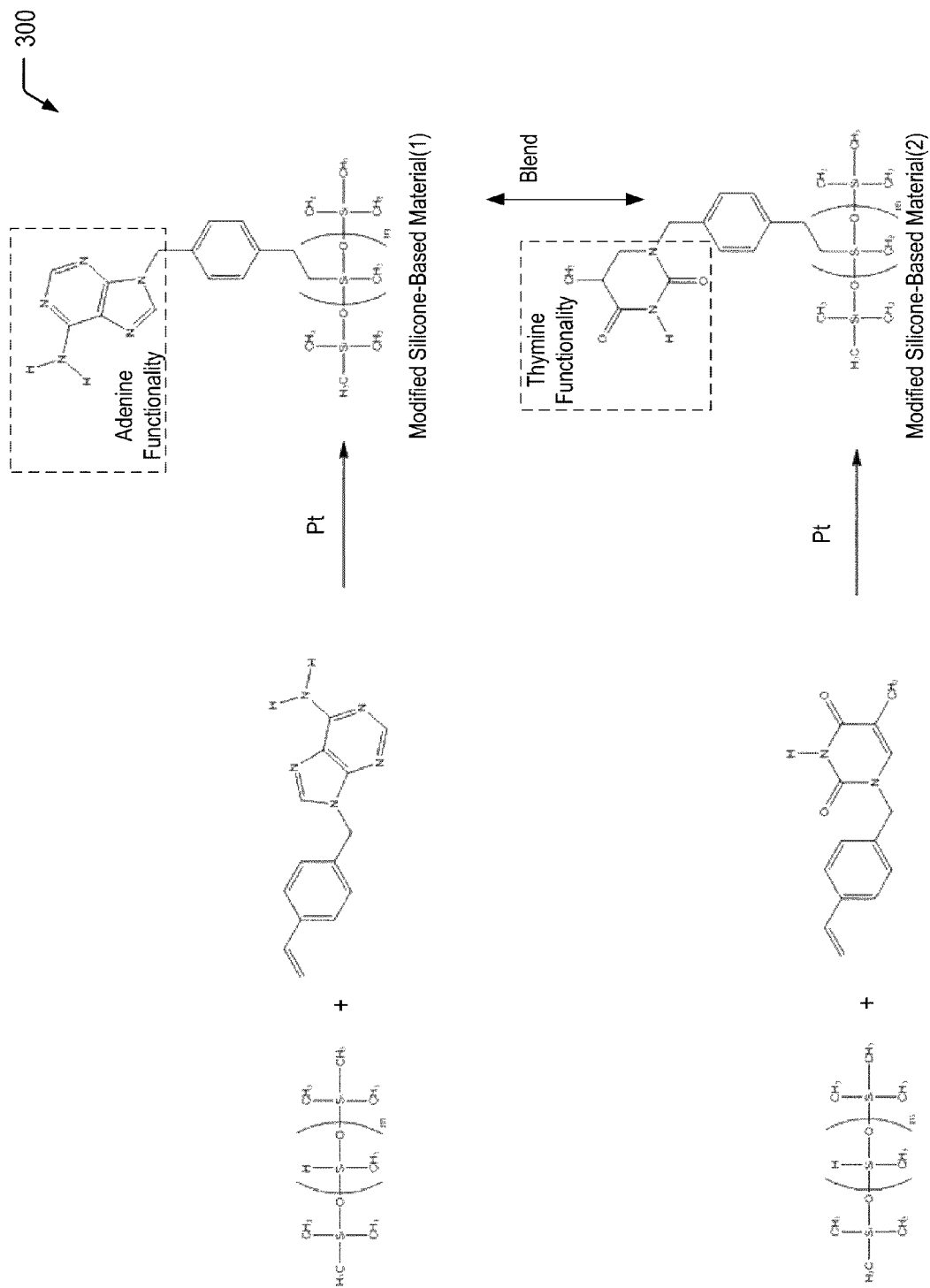
FIG. 3 is a chemical reaction diagram illustrating a process of forming a blend that includes a first reactive silicone material that is modified to include a first functional group and a second reactive silicone material that is modified to include a second functional group in order to allow for hydrogen bonding, according to one embodiment.

Referring to FIG. 3, a chemical reaction diagram 300 illustrates a particular embodiment of a process of forming a blend that includes a first reactive silicone material that includes a first functional group and a second reactive silicone material that includes a second functional group in order to allow for hydrogen bonding. In the first chemical reaction depicted at the top of FIG. 3, the reactive silicone material is chemically reacted with an adenine functional group material. In the second chemical reaction depicted at the bottom of FIG. 3, the reactive silicone material is chemically reacted with a thymine functional group material. Blending the two materials together allows for hydrogen bonding between the adenine functional groups and the thymine functional groups. As described further herein, the hydrogen bonding may allow the blend depicted in FIG. 3 to be utilized as a component of a self-healing thermal interface material.

The first chemical reaction depicted at the top of FIG. 3 illustrates the modification of a reactive silicone-based material with an adenine functional group to form a first modified silicone-based material that includes the adenine functional group bonded to the silicone polymer backbone. In the particular embodiment illustrated in FIG. 3, the adenine functional group material (depicted at the top of FIG. 3) is 9-(4-vinylbenzyl)-9H-purin-6-amine. In other embodiments, alternative and/or additional materials that include adenine functional groups may be utilized. FIG. 3 further illustrates that a catalyst such as platinum (Pt) may be utilized to bond the adenine functional group material to the silicone polymer backbone. The right side of the first chemical reaction diagram of FIG. 3 illustrates that the resultant product includes adenine functional groups bound to the silicone polymer backbone.

The second chemical reaction depicted at the bottom of FIG. 3 illustrates the modification of a reactive silicone-based material with a thymine functional group to form a second modified silicone-based material that includes the thymine functional group bonded to the silicone polymer backbone. In the particular embodiment illustrated in FIG. 3, the thymine functional group material (depicted at the bottom of FIG. 3) is 5-methyl-1-(4-vinylbenzyl)pyrimidine-2,4(1H,3H)-dione. In other embodiments, alternative and/or additional materials that include thymine functional groups may be utilized. FIG. 3 further illustrates that a catalyst such as platinum (Pt) may be utilized to bond the functional group materials to the silicone polymer backbone. The right side of the second chemical reaction diagram of FIG. 3 illustrates that the resultant product includes thymine functional groups bound to the silicone polymer backbone.

FIG. 3 further illustrates that the first modified silicone-based material that includes the adenine functional group bonded to the silicone polymer backbone (depicted at the top of FIG. 3) may be blended with the second modified silicone-based material that includes the thymine functional group bonded to the silicone polymer backbone (depicted at the bottom of FIG. 3). As described further herein, the blend of the resultant materials depicted in FIG. 3 may be blended with thermally conductive filler material(s) such as alumina to generate a self-healing thermal interface material.

Thus, FIG. 3 illustrates an example of a process of forming a blend that includes a first reactive silicone material that includes a first functional group (e.g., an adenine functional group) and a second reactive silicone material that includes a second functional group (e.g., a thymine functional group) in order to allow for hydrogen bonding. As described further herein, the ability of the functional groups to form hydrogen bonds allows the blend depicted in FIG. 3 to be utilized as a component of a self-healing thermal interface material.

Figure 4:
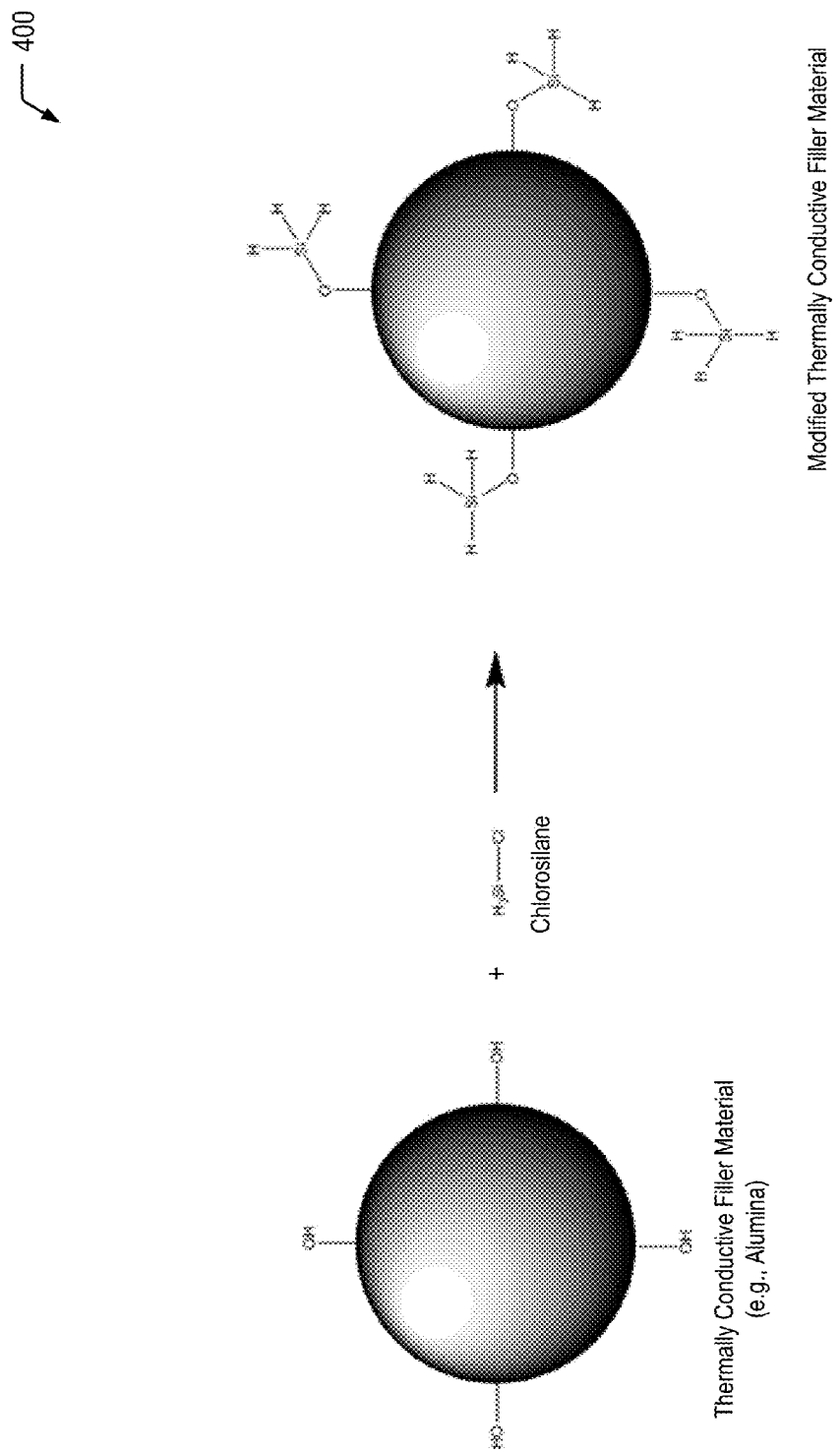
FIG. 4 is a diagram illustrating a process of modifying a thermally conductive filler material with a functional group that allows for additional hydrogen bonding, according to one embodiment.

Referring to FIG. 4, a diagram 400 illustrates a process of modifying a thermally conductive filler material with a functional group that allows for additional hydrogen bonding. In a particular embodiment, the thermally conductive filler material of FIG. 4 includes alumina. In other cases (e.g., in the case of a silicone-base caulk), the thermally conductive filler material may include a silica particle.

FIG. 4 illustrates that a chemical reaction of the thermally conductive filler material (e.g., alumina) with a chlorosilane results in the formation of the modified thermally conductive filler material depicted on the right side of FIG. 4. As described further herein with respect to FIGS. 5-9, the modified thermally conductive filler material of FIG. 4 may represent a component of a blend of materials that may be utilized as a self-healing thermal interface material (e.g., the self-healing thermal interface material 102 of FIG. 1).

Figure 5:
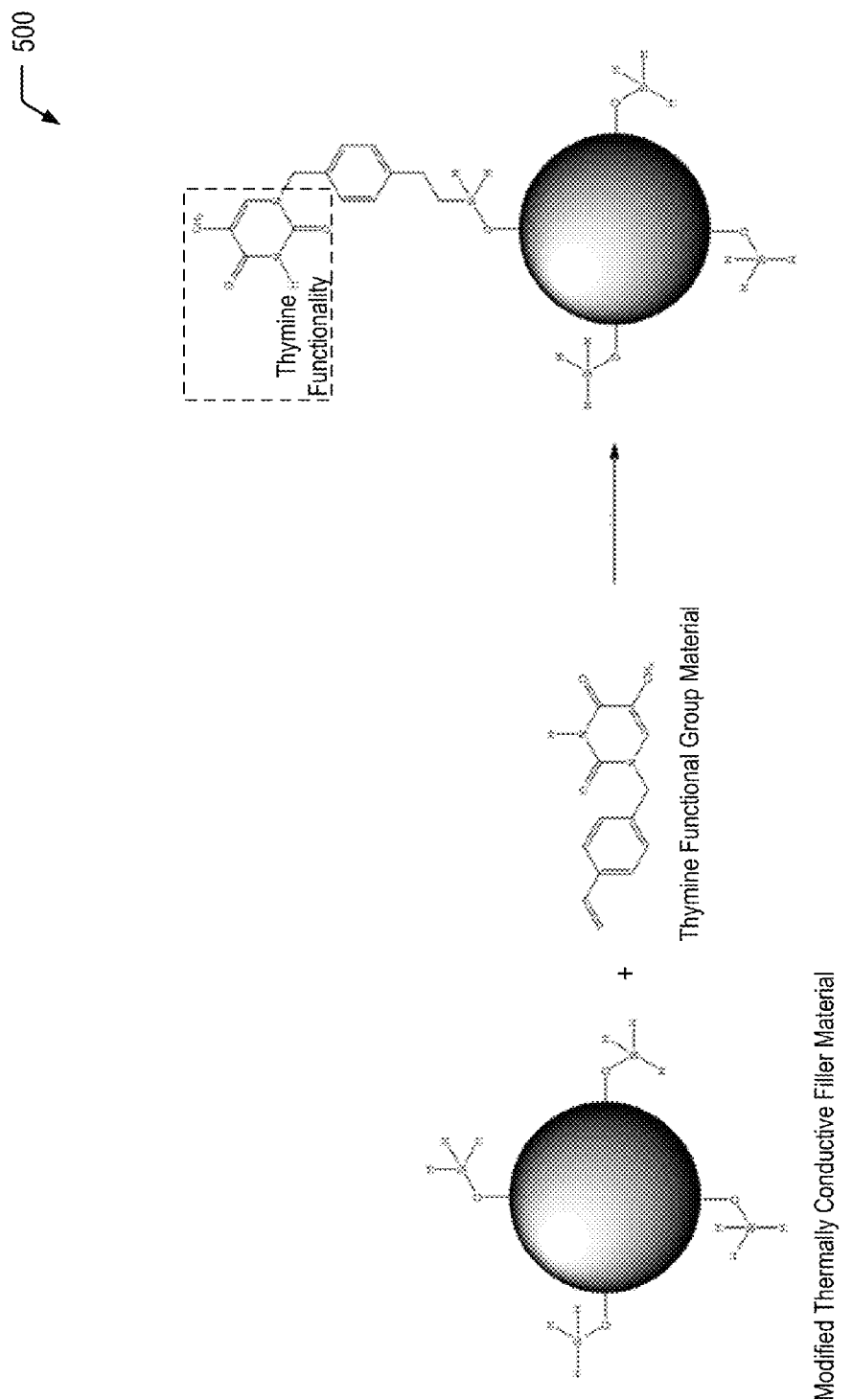
FIG. 5 is a diagram illustrating a process of bonding a functional group to the modified thermally conductive filler material of FIG. 4, according to one embodiment.

Referring to FIG. 5, a diagram 500 depicts an example of a process of bonding a functional group to the modified thermally conductive filler material of FIG. 4. In some cases, as illustrated and further described herein with respect to FIG. 7, the resultant material of FIG. 5 may be blended with the resultant material of FIG. 6 in order to allow for hydrogen bonding between the two functional groups. In other cases, as illustrated and further described herein with respect to FIG. 8, the resultant material of FIG. 5 may be blended with the resultant material depicted at of the top of FIG. 3 in order to allow for hydrogen bonding between the two functional groups.

Figure 6:
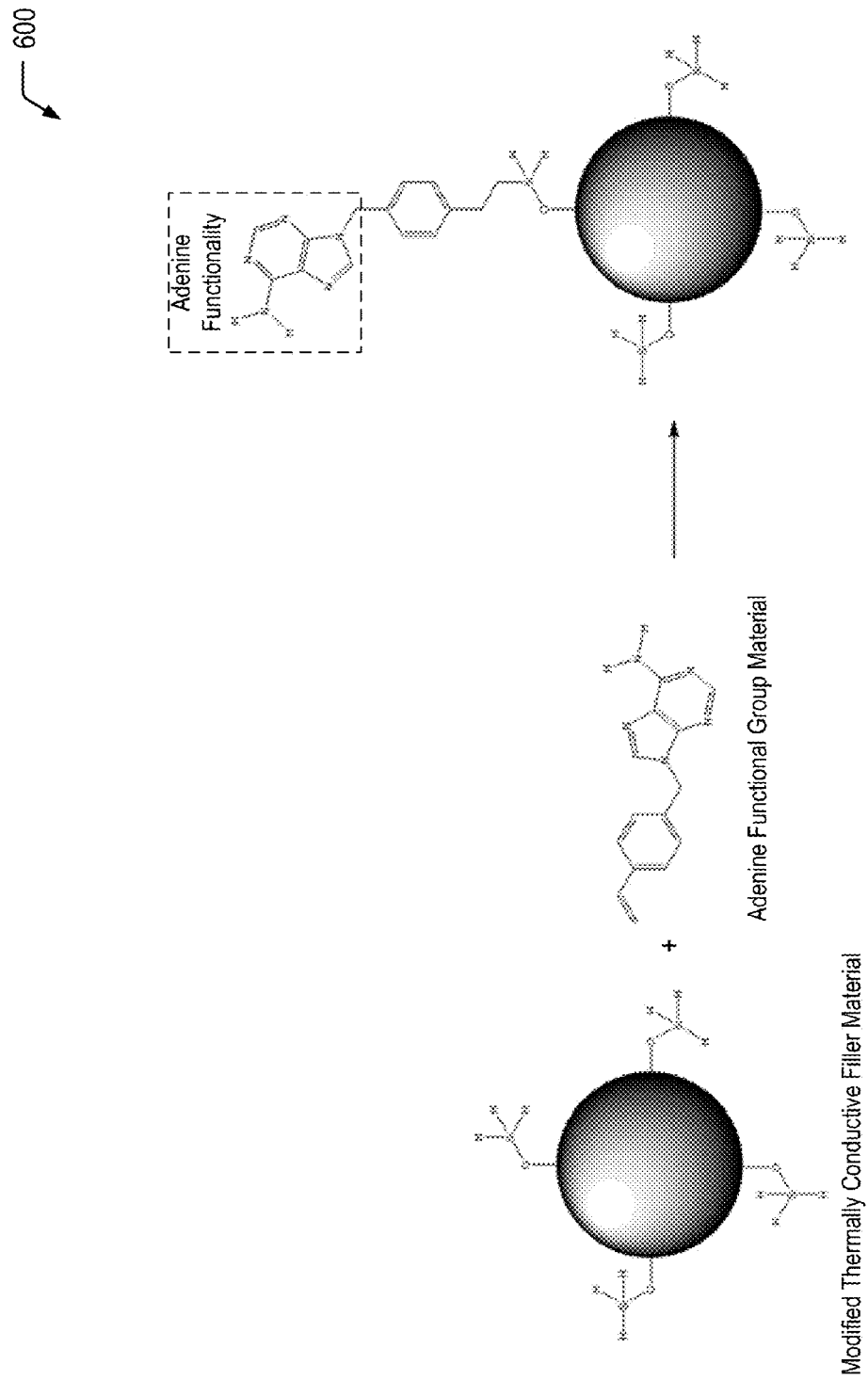
FIG. 6 is a diagram illustrating a process of bonding a functional group to the modified thermally conductive filler material of FIG. 4, according to one embodiment.

Referring to FIG. 6, a diagram 600 depicts an example of a process of bonding a functional group to the modified thermally conductive filler material of FIG. 4. In some cases, as illustrated and further described herein with respect to FIG. 7, the resultant material of FIG. 6 may be blended with the resultant material of FIG. 5 in order to allow for hydrogen bonding between the two functional groups. In other cases, as illustrated and further described herein with respect to FIG. 9, the resultant material of FIG. 6 may be blended with the resultant material depicted at of the bottom of FIG. 3 in order to allow for hydrogen bonding between the two functional groups.

Figure 7:
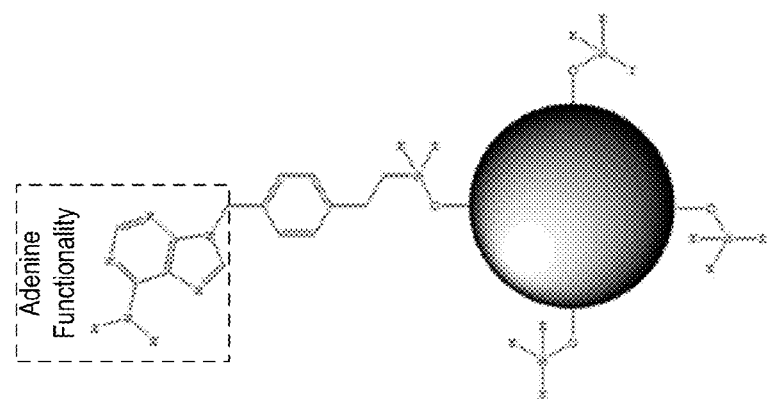
FIG. 7 is a diagram illustrating a process of blending the modified thermally conductive filler material of FIG. 5 with the modified thermally conductive filler material of FIG. 6 to allow for hydrogen bonding of the two functional groups, according to one embodiment.
Figure 7:
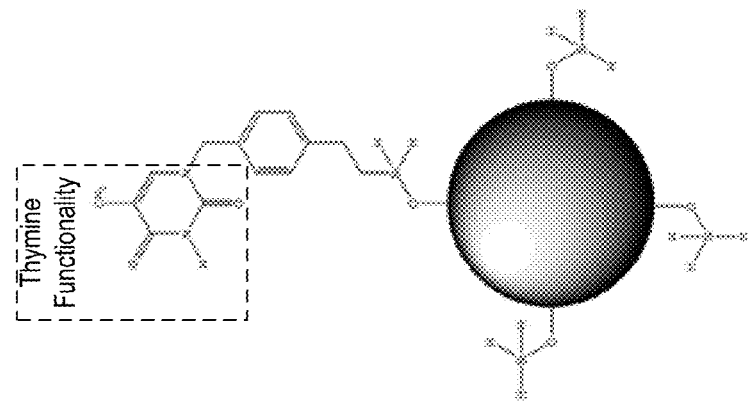

Referring to FIG. 7, a diagram 700 illustrates a process of blending the modified thermally conductive filler material of FIG. 5 with the modified thermally conductive filler material of FIG. 6 to allow for hydrogen bonding of the two functional groups, according to one embodiment. The blend depicted in FIG. 7 may then be blended into a non-modified or modified silicone-based material to form the self-healing thermal interface material 102 of FIG. 1.

Figure 8:
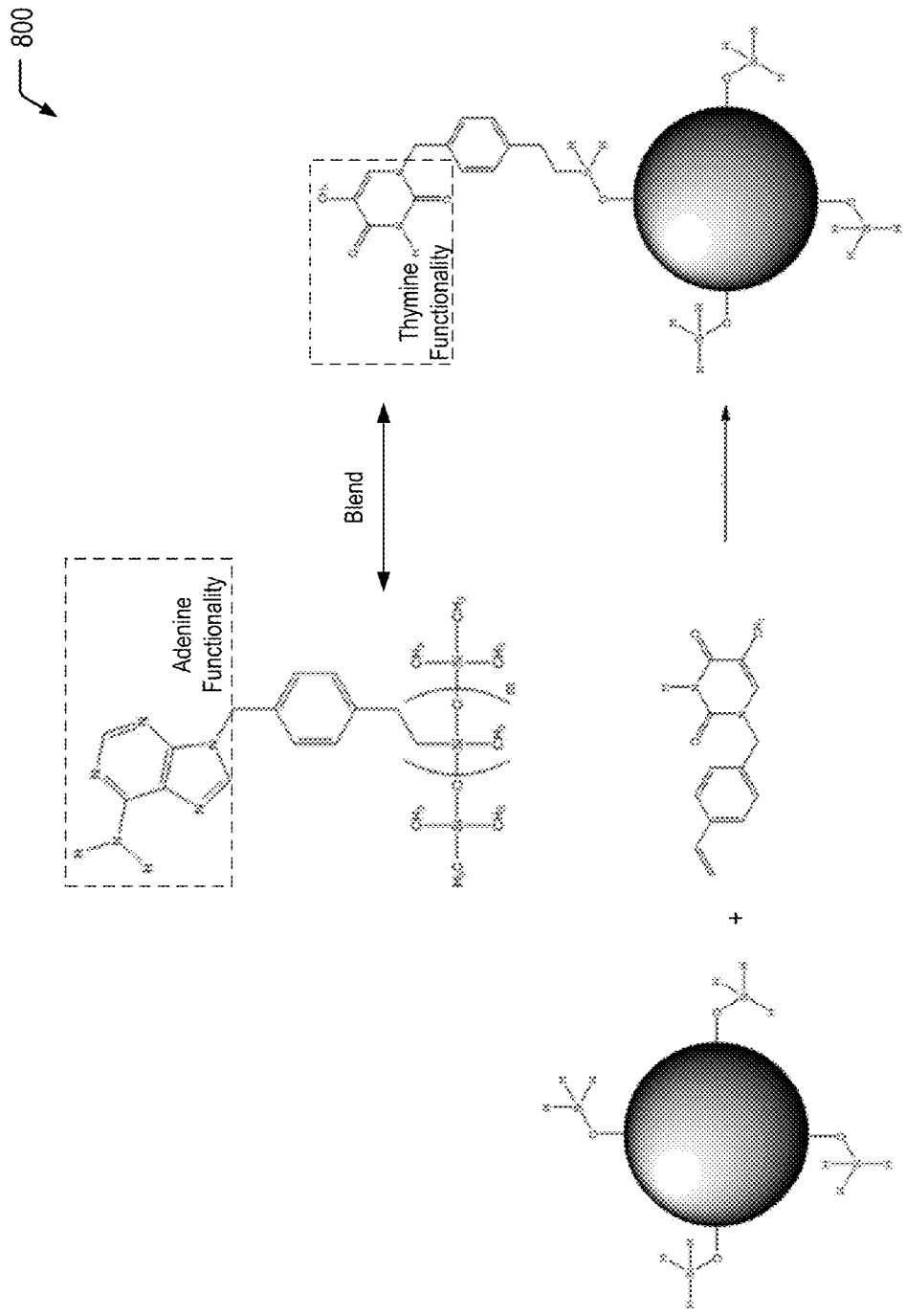
FIG. 8 is a diagram illustrating a process of blending the modified thermally conductive filler material of FIG. 5 with the modified silicone-based material depicted at the top of FIG. 3 to allow for hydrogen bonding of the two functional groups, according to one embodiment.

Referring to FIG. 8, a diagram 800 illustrates a process of blending the modified thermally conductive filler material of FIG. 5 with the modified silicone-based material depicted at the top of FIG. 3 to allow for hydrogen bonding of the two functional groups, according to one embodiment.

Figure 9:
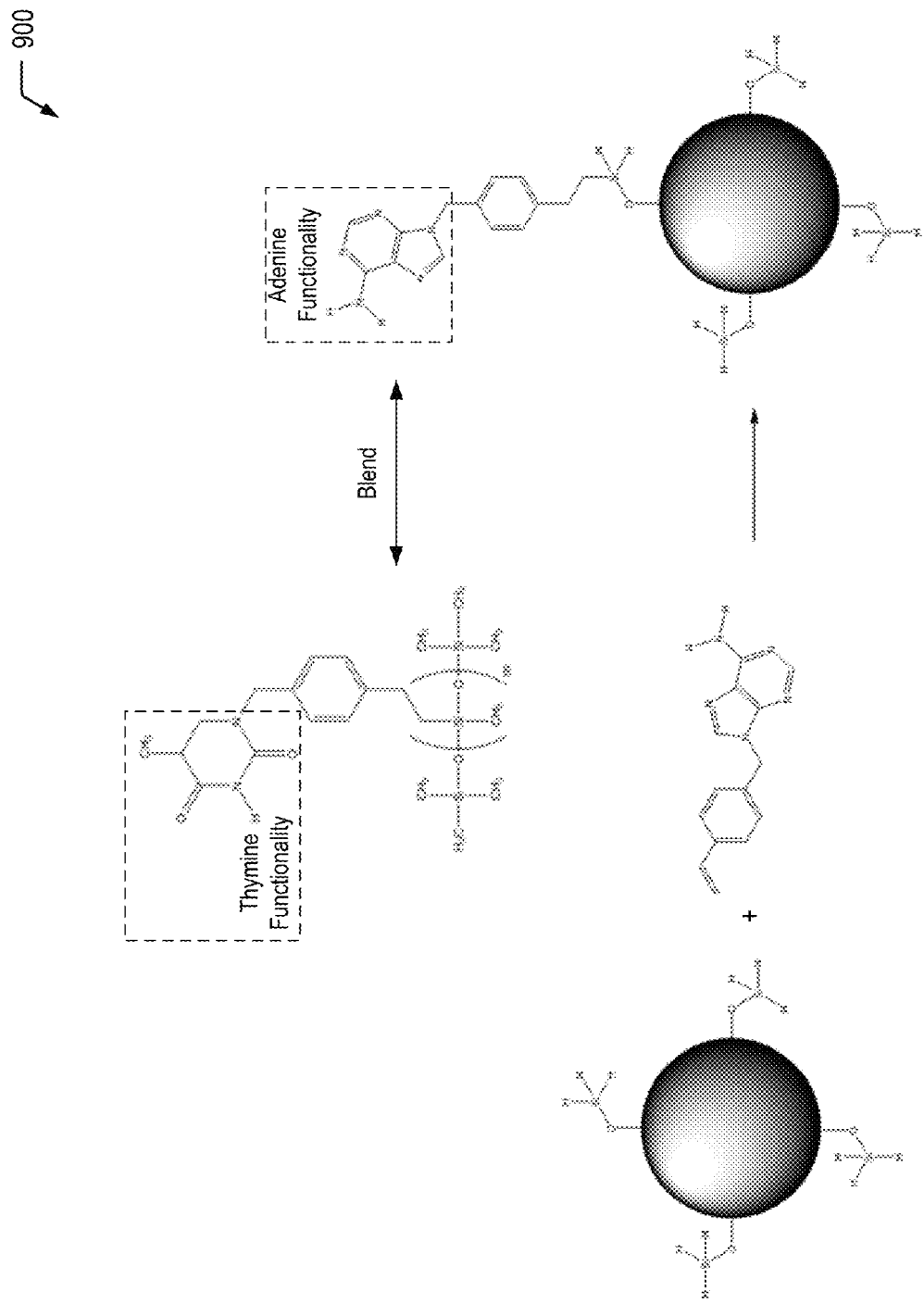
FIG. 9 is a diagram illustrating a process of blending the modified thermally conductive filler material of FIG. 6 with the modified silicone-based material depicted at the bottom of FIG. 3 to allow for hydrogen bonding of the two functional groups, according to one embodiment.

Referring to FIG. 9, a diagram 900 illustrates a process of blending the modified thermally conductive filler material of FIG. 6 with the modified silicone-based material depicted at the bottom of FIG. 3 to allow for hydrogen bonding of the two functional groups, according to one embodiment.

Figure 10:
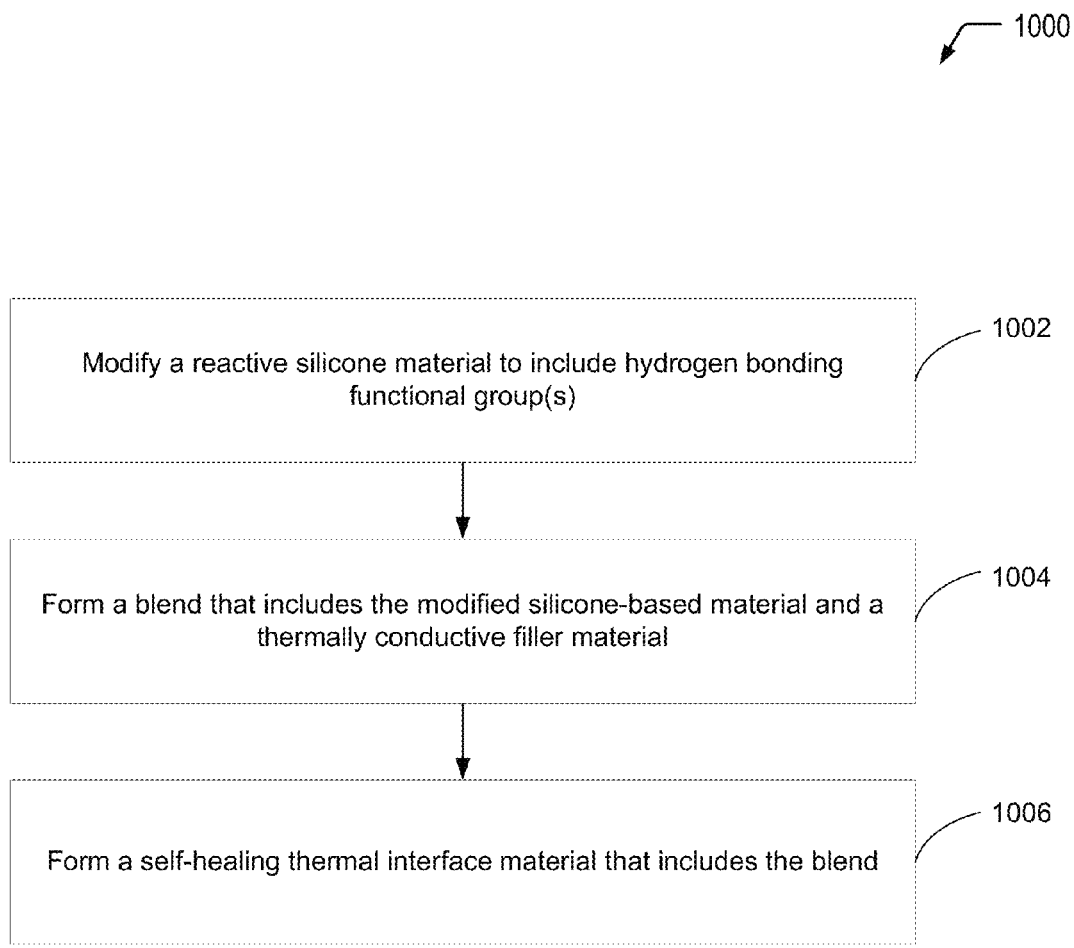
FIG. 10 is a flow diagram showing a particular embodiment of a process of forming a self-healing thermal interface material that includes a blend of a modified silicone-based material and a thermally conductive filler material.

Referring to FIG. 10, a flow diagram illustrates an exemplary process 1000 of forming a self-healing thermal interface material, according to a particular embodiment. As described further herein, the self-healing thermal interface materials of the present disclosure may be generated using thermally conductive filler materials which are blended into a silicone-based material that affords the ability to self-heal when cracking or voiding occurs via functional groups that have been attached to the silicone. The silicone-based materials of the present disclosure include reactive silicones that are modified to incorporate functional groups that, when in contact with each other, allow for hydrogen bonding. Hydrogen bonding between the functional groups enables the thermal interface material to "self-heal" itself as it undergoes thermal pumping.

The process 1000 includes modifying a reactive silicone material to include one or more hydrogen bonding functional groups, at 1002. For example, referring to FIG. 2, the reactive silicone material may be chemically reacted with the blend of adenine functional group material and thymine functional group material to form the modified silicone-based material that includes both the adenine functional group and the thymine functional group. As another example, referring to FIG. 3, the reactive silicone material may be chemically reacted with an adenine functional group material (depicted at the top of FIG. 3), and the reactive silicone material may be chemically reacted with a thymine functional group material (depicted at the bottom of FIG. 3). As shown in FIG. 3, the resulting modified materials may be used to form a blend that includes a first modified silicone-based material and a second modified silicone-based material.

The process 1000 includes forming a blend that includes the modified silicone-based material and a thermally conductive filler material, at 1004. For example, the modified silicone-based material of FIG. 2 may be blended with a thermally conductive filler material (e.g., alumina). As another example, the blend of the modified silicone-based materials of FIG. 3 may be blended with a thermally conductive filler material (e.g., alumina).

The process 1000 includes forming a self-healing thermal interface material that includes the blend, at 1006. For example, the modified silicone-based material of FIG. 2 that includes both the adenine functional group and the thymine functional group may be used as a component of the self-healing thermal interface material 102 depicted in FIG. 1. As another example, referring to FIG. 3, a blend that includes the first modified silicone-based material that includes the adenine functional group and the second modified silicone-based material that includes the thymine functional group may be used to form a component of the self-healing thermal interface material 102 depicted in FIG. 1.

Thus, FIG. 10 illustrates an example of a process of forming a self-healing thermal interface material. The self-healing thermal interface material formed according to the process depicted in FIG. 10 may include modified silicone-based materials that include functional groups that allow for hydrogen bonding between the functional groups such that the thermal interface material may "self-heal" itself as it undergoes thermal pumping.

Figure 11:
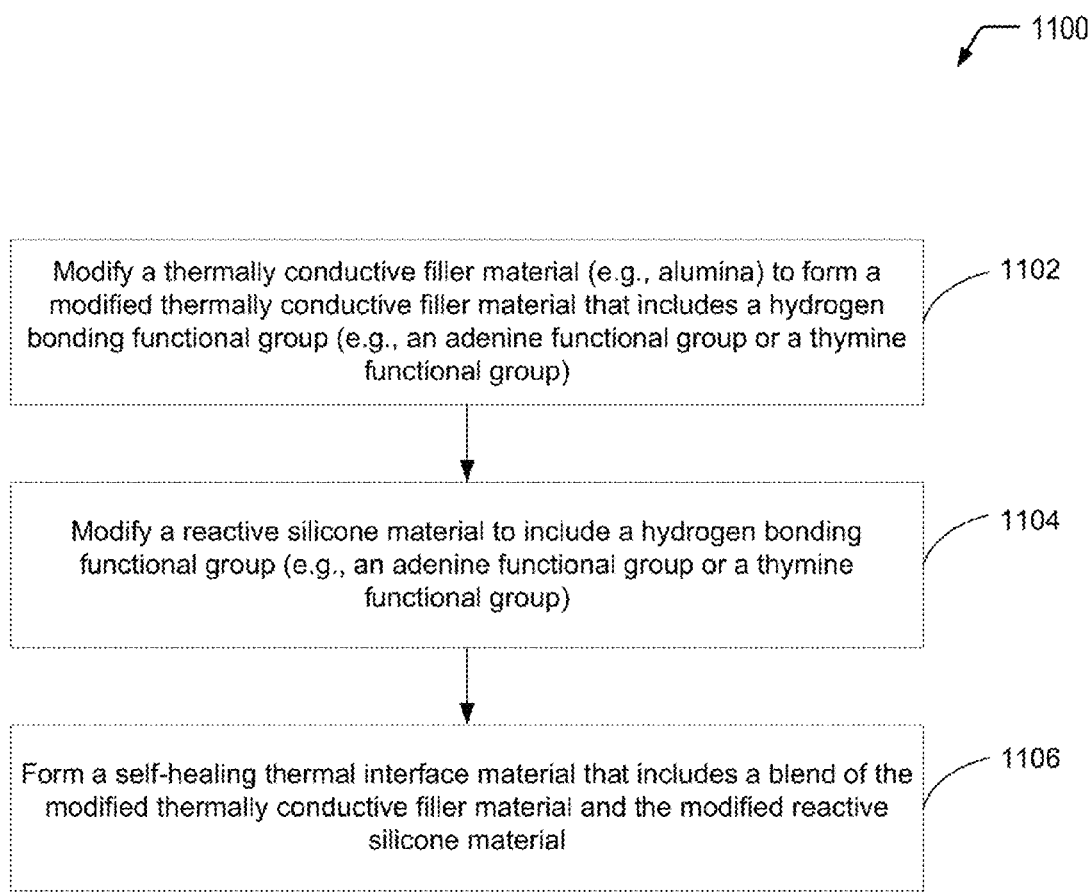
FIG. 11 is a flow diagram showing a particular embodiment of a process of forming a self-healing thermal interface material that includes a blend of a modified thermally conductive filler material and a modified silicone-based material.

Referring to FIG. 11, a flow diagram illustrates an exemplary process 1100 of forming a self-healing thermal interface material, according to a particular embodiment. As described further herein, the self-healing thermal interface materials of the present disclosure may be generated using thermally conductive fillers which are blended into a silicone-based material that affords the ability to self-heal when cracking or voiding occurs via functional groups that have been attached to the silicone. The silicone-based materials of the present disclosure include reactive silicones that are modified to incorporate functional groups that, when in contact with each other, allow for hydrogen bonding. Hydrogen bonding between the functional groups enables the thermal interface material to "self-heal" itself as it undergoes thermal pumping.

The process 1100 includes modifying a thermally conductive filler material to form a modified thermally conductive filler material, at 1102. The modified thermally conductive filler material includes a hydrogen bonding functional group (e.g., an adenine functional group or a thymine functional group). For example, referring to FIG. 4, the thermally conductive filler material (e.g., alumina) may be chemically reacted with a chlorosilane material to form the modified thermally conductive filler material. In some cases, as shown in FIG. 5, the modified thermally conductive filler material of FIG. 4 may be modified with a thymine functional group. In other cases, as shown in FIG. 6, the modified thermally conductive filler material of FIG. 4 may be modified with an adenine functional group.

The process 1100 includes modifying a reactive silicone material to include a hydrogen bonding functional group, at 1104. For example, referring to the chemical reaction depicted at the top of FIG. 3, the reactive silicone material may be chemically reacted with an adenine functional group material to form the first modified silicone-based material. As another example, referring to the chemical reaction depicted at the bottom of FIG. 3, the reactive silicone material may be chemically reacted with a thymine functional group material to form the second modified silicone-based material.

The process 1100 includes forming a self-healing thermal interface material that includes the modified thermally conductive filler material and the modified reactive silicone material, at 1106. For example, referring to FIG. 7, the modified thermally conductive filler material of FIG. 5 (including a thymine functional group) and the modified thermally conductive filler material of FIG. 6 (including an adenine functional group) may be blended with a modified or non-modified silicone based-based material and utilized to form the self-healing thermal interface material 102 of FIG. 1. As another example, the modified thermally conductive filler material of FIG. 8 (including the thymine functional group) may be blended with the modified reactive silicone material depicted at the top of FIG. 3 (including the adenine functional group) to form the self-healing thermal interface material 102 of FIG. 1. As a further example, the modified thermally conductive filler material of FIG. 9 (including the adenine functional group) may be blended with the modified reactive silicone material depicted at the bottom of FIG. 3 (including the thymine functional group) to form the self-healing thermal interface material 102 of FIG. 1.

Thus, FIG. 11 illustrates an example of a process of forming a self-healing thermal interface material. The self-healing thermal interface material formed according to the process depicted in FIG. 11 may include modified silicone-based materials that include functional groups that allow for hydrogen bonding between the functional groups such that the thermal interface material may "self-heal" itself as it undergoes thermal pumping.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A self-healing thermal interface material comprising:
   a reactive silicone-based material that is modified to include one or more hydrogen bonding functional groups; and
   a thermally conductive filler material that is modified to include a thymine functional group or an adenine functional group.

2. The self-healing thermal interface material of claim 1, wherein the one or more hydrogen bonding functional groups include at least one of a thymine functional group or an adenine functional group.

3. The self-healing thermal interface material of claim 2, wherein the reactive silicone-based material is modified to include the adenine functional group and the thymine functional group.

4. The self-healing thermal interface material of claim 1, wherein the reactive silicone-based material includes a blend of modified silicone-based materials, the blend of modified silicone-based materials including a first silicone-based material that is modified to include a thymine functional group and a second silicone-based material that is modified to include an adenine functional group.

5. The self-healing thermal interface material of claim 1, wherein the thermally conductive filler material includes alumina.

6. The self-healing thermal interface material of claim 1, wherein the thermally conductive filler material is modified to include the thymine functional group, and wherein the reactive silicone-based material is modified to include the adenine functional group.

7. The self-healing thermal interface material of claim 1, wherein the thermally conductive filler material is modified to include the adenine functional group, and wherein the reactive silicone-based material is modified to include the thymine functional group.

8. A self-healing thermal interface material comprising:
a silicone-based material;
a first thermally conductive filler material that is modified to include a thymine functional group; and
a second thermally conductive filler material that is modified to include an adenine functional group.

9. The self-healing thermal interface material of claim 8, wherein the first thermally conductive filler material is formed via a chemical reaction of a silicon hydride modified alumina material and a thymine functional group material.

10. The self-healing thermal interface material of claim 9, wherein the thymine functional group material includes 5-methyl-1-(4-vinylbenzyl)pyrimidine-2,4(1H,3H)-dione.

11. The self-healing thermal interface material of claim 8, wherein the second thermally conductive filler material is formed via a chemical reaction of a silicon hydride modified alumina material and an adenine functional group material.

12. The self-healing thermal interface material of claim 11, wherein the adenine functional group material includes 9-(4-vinylbenzyl)-9H-purin-6-amine.

13. A process of forming a self-healing thermal interface material, the process comprising:
modifying a reactive silicone-based material to include one or more hydrogen bonding functional groups;
forming a blend that includes the modified reactive silicone-based material and a thermally conductive filler material that is modified to include a thymine functional group or an adenine functional group; and
forming a self-healing thermal interface material that includes the blend.

14. The process of claim 13, wherein the one of more hydrogen bonding functional groups include at least one of a thymine functional group or an adenine functional group.

15. The process of claim 14, wherein the modified reactive silicone-based material includes the thymine functional group and the adenine functional group.

16. The process of claim 14, wherein the modified reactive silicone-based material includes a blend of modified reactive silicone-based materials, the blend including a first modified silicone-based material that includes a thymine functional group and a second modified silicone-based material that includes an adenine functional group.

17. The process of claim 16, wherein:
the first modified silicone-based material is formed by chemically reacting the reactive silicone-based material with 5-methyl-1-(4-vinylbenzyl)pyrimidine-2,4(1H, 3H)-dione.

18. The process of claim 13, wherein the modified reactive silicone-based material includes a thymine functional group, and wherein the thermally conductive filler material is modified to include an adenine functional group.

19. The process of claim 13, wherein the modified reactive silicone-based material includes an adenine functional group, and wherein the thermally conductive filler material is modified to include a thymine functional group.

20. The process of claim 16, wherein the second modified silicone-based material is formed by chemically reacting the reactive silicone-based material with 9-(4-vinylbenzyl)-9H-purin-6-amine.

* * * * *